(12) United States Patent
Moguillansky

(10) Patent No.: US 8,854,396 B2
(45) Date of Patent: Oct. 7, 2014

(54) RENDERING IMAGE ON WEB BROWSER DISPLAY AT SMALLER RESOLUTION THAN ORIGINAL IMAGE WITHOUT STORING ORIGINAL IMAGE FIRST TO CONSERVE SPACE

(75) Inventor: Jeffrey Moguillansky, San Diego, CA (US)

(73) Assignee: Sony Corporation, Tokyo (JP)

( * ) Notice: Subject to any disclaimer, the term of this patent is extended or adjusted under 35 U.S.C. 154(b) by 302 days.

(21) Appl. No.: 13/297,529

(22) Filed: Nov. 16, 2011

(65) Prior Publication Data

US 2013/0120389 A1 May 16, 2013

(51) Int. Cl.
| | |
|---|---|
| G09G 5/00 | (2006.01) |
| G06T 3/40 | (2006.01) |
| G06F 17/30 | (2006.01) |
| H04N 21/81 | (2011.01) |
| H04N 21/4782 | (2011.01) |
| H04N 21/4402 | (2011.01) |
| H04N 21/433 | (2011.01) |

(52) U.S. Cl.
CPC .......... *G06T 3/4092* (2013.01); *H04N 21/8153* (2013.01); *H04N 21/4782* (2013.01); *H04N 21/440263* (2013.01); *G06F 17/30905* (2013.01); *H04N 21/4331* (2013.01)
USPC ........................................ 345/660

(58) Field of Classification Search
USPC ........................................ 345/660
See application file for complete search history.

(56) References Cited

U.S. PATENT DOCUMENTS

| | | | | |
|---|---|---|---|---|
| 5,764,235 | A * | 6/1998 | Hunt et al. | 345/428 |
| 6,006,231 | A * | 12/1999 | Popa | 1/1 |
| 6,011,537 | A * | 1/2000 | Slotznick | 715/733 |
| 6,281,874 | B1 * | 8/2001 | Sivan et al. | 345/660 |
| 6,449,639 | B1 * | 9/2002 | Blumberg | 709/217 |
| 6,577,311 | B1 * | 6/2003 | Crosby et al. | 345/428 |
| 7,260,614 | B2 * | 8/2007 | Deshpande et al. | 709/217 |
| 7,957,603 | B2 | 6/2011 | Tu et al. | |
| 2002/0025085 | A1 * | 2/2002 | Gustafson et al. | 382/311 |
| 2007/0299830 | A1 | 12/2007 | Muenchhoff | |
| 2011/0148932 | A1 | 6/2011 | Niemi et al. | |
| 2012/0005259 | A1 * | 1/2012 | Cok | 709/203 |

* cited by examiner

*Primary Examiner* — M Good Johnson
(74) *Attorney, Agent, or Firm* — John L. Rogitz

(57) ABSTRACT

An accessing computer accessing an image specified by a web page to be rendered at a resolution that is smaller than the resolution of the full image downloaded from the server does not store the full image. Instead, the accessing computer immediately decompresses the full image to the specified smaller resolution, renders it, and then stores the smaller version of the image.

20 Claims, 2 Drawing Sheets

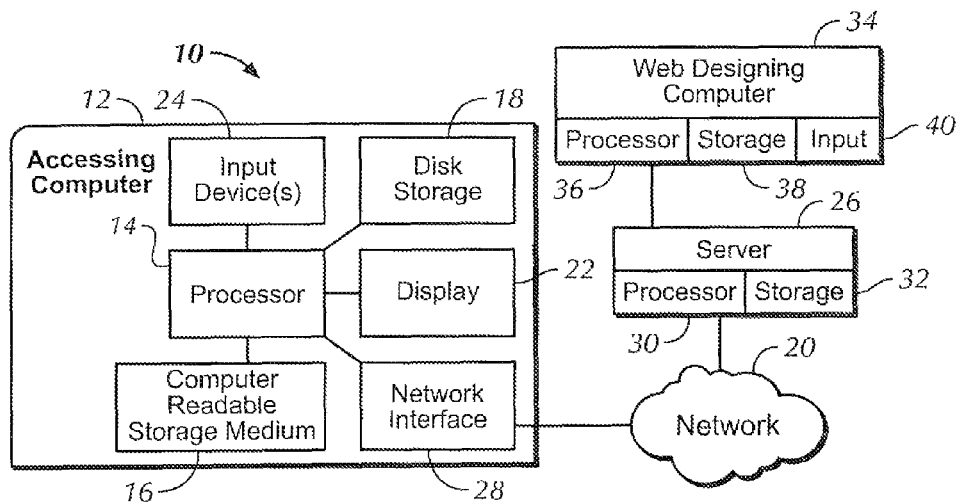
FIG. 1
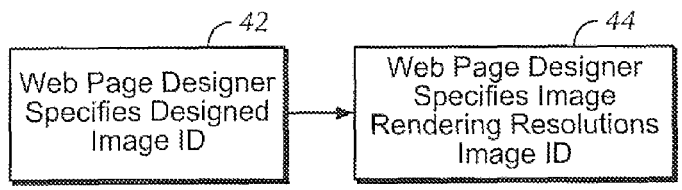
FIG. 2  Web Design Logic
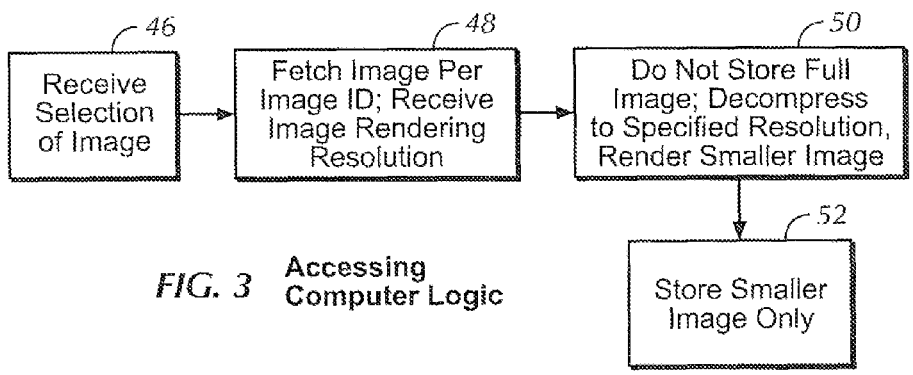
FIG. 3  Accessing Computer Logic

RENDERING IMAGE ON WEB BROWSER DISPLAY AT SMALLER RESOLUTION THAN ORIGINAL IMAGE WITHOUT STORING ORIGINAL IMAGE FIRST TO CONSERVE SPACE

FIELD OF THE INVENTION

The present application relates generally to rendering an image at a resolution specified by a web designer to be smaller than the original image resolution without an accessing computer storing the full resolution original image first to conserve storage space.

BACKGROUND OF THE INVENTION

When an accessing computer seeks to render an image specified by a selected Web page, the accessing computer retrieves the full image, decodes it, and stores it. As understood herein, it may happen that the image is designated to be presented in a resolution that is smaller than the resolution of the original full image. In such a case, the accessing computer down-scales the original image that had been stored in its memory and presents the down-scaled version. But as understood herein, this means that greater storage space than necessary for the specified resolution has been consumed in the accessing computer.

SUMMARY OF THE INVENTION

Accordingly, an accessing computer includes a display, an input device, and a processor controlling the display and receiving signals from the input device. A network interface is provided through which the processor communicates with an Internet server storing a full resolution version of an image. Computer readable storage media are accessible to the processor and bear a web browser executable by the processor to respond to a signal from the input device to render an image identified on a web page by, responsive to the signal, retrieving the full resolution version of the image according to an image identification specified by the web page but not storing the full resolution version of the image. Instead, the full resolution version of the image is decompressed to a smaller resolution version of the image according to an image dimension specified by the web page, and the smaller resolution version of the image is rendered on the display. Only the smaller resolution version of the image and not the full resolution version of the image is stored at the accessing computer.

In example embodiments the full resolution version can be 1920 by 1080 pixels and the smaller resolution version can be 720 by 480 pixels. The accessing computer retrieves image information to render the smaller resolution version of the image, and in one example the image information is in the format: img width="[int]" height="[int]" url="[image name]">, wherein "int" is a respective integer. In another example the image information is in the format: Image img=new Image (); img.width=[int]; img.height=[int]; img.url="image name", wherein "int" is a respective integer.

In some embodiments, with the smaller resolution version of the image stored locally, the accessing computer, responsive to a user selection of an image, determines whether information of the image specified on a web page subject to the user selection indicates the same dimensions and identifies the same image as the smaller resolution version of the image stored locally. Responsive to a determination that information of the image specified on the web page subject to the user selection indicates the same dimensions and identifies the same image as the smaller resolution version of the image stored locally, the accessing computer presents the locally stored image on the display. However, responsive to a determination that information of the image specified on the web page subject to the user selection indicates different dimensions than the smaller resolution version of the image stored locally and identifies the same image as the smaller resolution version of the image stored locally, the accessing computer retrieves the full resolution version of the image from the server, does not store the full resolution version, decompresses the full resolution version to a new smaller version of the image according to the information of the image, renders the new smaller version, and stores the new smaller version in place of the smaller resolution version of the image previously stored locally.

In another aspect, a method includes accessing an image specified by a web page to be rendered at a resolution that is smaller than a resolution of a full version of the image stored on a server. The method includes downloading full version of the image but not storing the full version of the server on computer memory or computer disk media. The full image is processed to render a smaller resolution version of the image according to the resolution specified by the web page. The method also includes presenting the smaller resolution version of the image, and storing the smaller resolution version of the image and not storing the full version of the image.

In another aspect, a computer system includes a server computer storing a full resolution version of an image and an accessing computer rendering a web page on a display. The web page contains image information including an identification of the full resolution version and a desired rendering resolution smaller than the full resolution. The accessing computer responsive to a user selection of the image retrieves the full resolution version of the image from the server but does not store the full resolution version. Instead, the accessing computer processes the full resolution version to render a smaller resolution version according to the image information and presents and stores only the smaller resolution version.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a non-limiting example system in accordance with present principles;

FIG. 2 is a flow chart of example web designer computer logic; and

FIGS. 3 and 4 are flow charts of example accessing computer logic.

DETAILED DESCRIPTION OF THE PREFERRED EMBODIMENT

Figure 4:
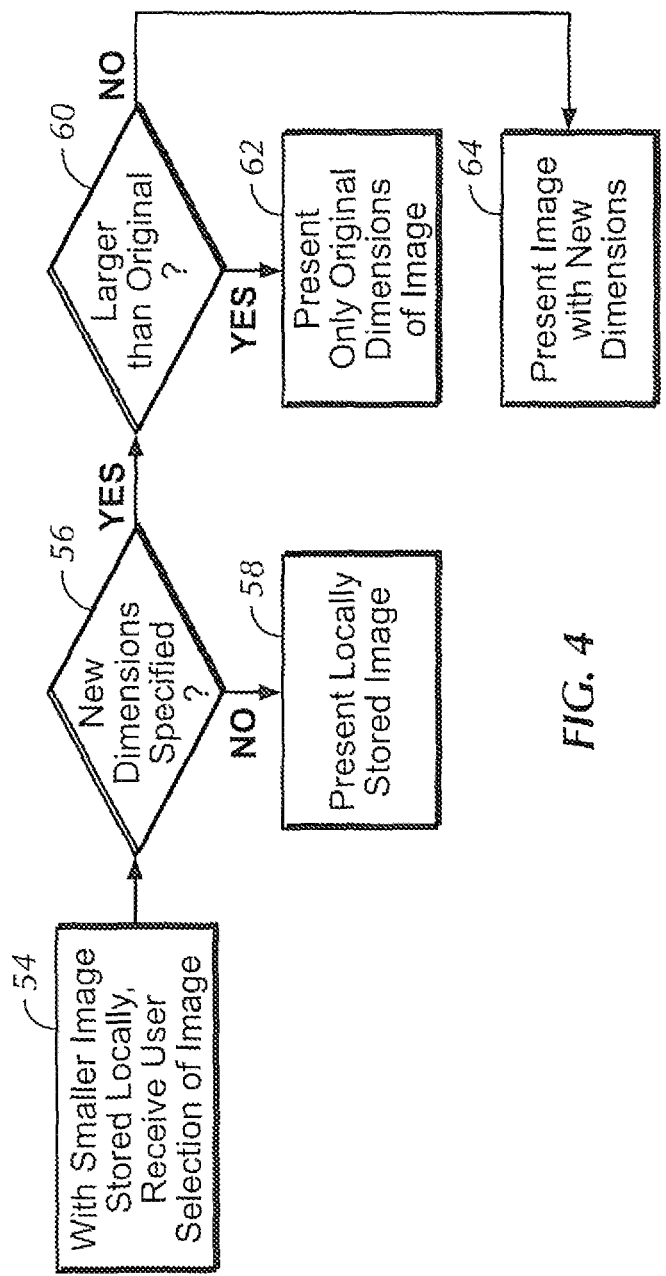

Referring initially to the non-limiting example embodiment shown in FIG. 1, a system 10 includes an accessing computer 12 that has, among other components, a processor 14 accessing a computer readable storage medium 16 such as solid state memory. Disk memory 18 may also be accessible to the processor 14. The processor 14 may execute a web browser stored on one of the memories 16, 18 to render images from the Internet 20 on a display 22 such as a standard definition computer monitor, a touch screen display, a flat screen standard definition or high definition display, or other video display. Images may be downloaded based on selections of a presented web page input by means of one or more input devices 24 such as mice or other point-and-click devices, keypads, keyboards, voice recognition software, etc. The processor 14 communicates with one or more servers 26 using a network interface 28 such as a wired or wireless modem. Each server 26 typically includes one or more server processors 30 accessing one or more computer readable storage media 32. Web pages sourced by the server 26 may be configured by a web designer computer 34 including one or more processors 36 accessing one or more computer readable storage media 38 according to designer user input signals from one or more input devices 40. The accessing computer 12 and web designer computer 34 may be, without limitation, a workstation computer, a desktop computer, a laptop computer, a notebook computer, a personal digital assistant (PDA), a wireless telephone.

Now referring to FIG. 2, commencing at block 42 a user of the web designer computer 34 specifies a desired image, typically by specifying an image identification, that the user wishes to be rendered on a Web page served by the server 26. The image identification may include information as to storage location of the image. At block 44 the user may also specify a resolution, equivalently the screen dimensions, that the user wants the image to be rendered in on the Web page when the Web page is displayed on an accessing computer 12.

As understood herein, the image referenced by the designer may be stored at the server 26 in a relatively high resolution that requires relatively large storage space, yet render a smaller version of the image at the accessing computer 12. For example suppose that a web page references a PNG image that is stored at the server 26 with the relatively large resolution/dimension of 1920×1080, which when decoded can consume up to eight megabytes. Suppose further that the web page designer wishes an accessing computer 12 to present the image but only at a lesser resolution, e.g., 720×480.

At blocks 42 and 44 the web page designer using the web designer computer 34 can accomplish the above by specifying an image object in hypertext markup language (HTML) as follows:
img width="720" height="480" url="image.png">
Or, the above image can be specified in Javascript as follows:
Image img=new Image (); img.width=720; img.height=480; img.url="image.png".

FIG. 3 illustrates subsequent logic executed by the accessing computer 12 responsive to a user selecting to download the image specified in FIG. 2. Such user selection typically occurs by a user viewing a web page on the display 22 under control of the processor 14 executing a browser and selecting, using an appropriate input device 24, a link to the image.

Commencing at block 46, the user selection of the image is received. Moving to block 48, the image is fetched according to the image identification, typically accompanying the selected link or otherwise embedded in the web page, that was specified at block 42. Also, the image rendering resolution input by the web designer at block 44 is also received. In some embodiments the rendering resolution is embedded in the link or is elsewhere on the web page.

Proceeding to block 50, the image is accessed but the full image downloaded from the server 26 (in the hypothetical above, the 1920×1080 image) is not stored in the accessing computer 12. Instead, it is decompressed as it is downloaded to the resolution specified at block 44 in FIG. 2 and the smaller version of the image (in the hypothetical above, the 720×480 version of the image) and rendered on the display 22. Then, the smaller version of the image is stored at block 52 on the accessing computer 12; the full original version downloaded from the server 26 is never stored in the storage media 16, 18 shown in FIG. 1 according to the logic shown in FIG. 3 and at most is perhaps incidentally and transitorily stored only in processor 14 temporary memory registers only until such time as decompression is complete.

FIG. 4 shows additional logic that may be executed by the accessing computer 12. Suppose the web designer subsequently changes the desired dimensions of the image as it is to be rendered on the display of an accessing computer, e.g., from 720×480 to 960×540 as follows (in Javascript):

```
Image img = new Image( );
img.width = 720; img.height = 480; img.url = "image.png";
context.drawImage(img);
img.width = 960; img.height=540;
context.drawImage(img).
```

Under these conditions, at block 54, with, the originally defined (smaller) image of 720×480 stored locally, the accessing computer 12 receives a user selection of the image. Moving to decision diamond 56, the accessing computer determines whether the specified dimensions of the image according to the above-described image information fetch pursuant to new user selection indicates a changed dimension from the image stored in local accessing computer 12 storage, and if not, the logic ends at block 58 by presenting the locally stored image on the display 22.

On the other hand, if the dimensions have changed since the prior image storage the logic moves from decision diamond 56 to decision diamond 60 to determine whether the new image dimensions are larger than the dimensions of the original image. If they are, the logic moves to block 62 to present the image but only in the original dimensions, not the dimensions specified in the newly-fetched image information. On the other hand, if the new image dimensions are not larger than the dimensions of the original image, the logic moves from decision diamond 60 to block 64 to present the image in the dimensions specified in the newly-fetched image information. Also at block 64 the new (in the above hypothetical, slightly larger) version of the image is stored and the older (in the hypothetical above, slightly smaller) image is removed from memory.

While the particular RENDERING IMAGE ON WEB BROWSER DISPLAY AT SMALLER RESOLUTION THAN ORIGINAL IMAGE WITHOUT STORING ORIGINAL IMAGE FIRST TO CONSERVE SPACE is herein shown and described in detail, it is to be understood that the subject matter which is encompassed by the present invention is limited only by the claims.

What is claimed is:
1. Accessing computer comprising:
display;
input device;
processor configured for controlling the display and configured for receiving signals from the input device;
network interface through which the processor is configured to communicate with an Internet server storing a full resolution version of an image; and
computer readable storage medium accessible to the processor and bearing a web browser executable by the processor to respond to a signal from the input device to render an image identified on a web page by:
responsive to the signal, retrieving the full resolution version of the image according to an image identification specified by the web page;

not storing the full resolution version of the image;
decompressing the full resolution version of the image to a smaller resolution version of the image according to an image dimension specified by the web page;
rendering the smaller resolution version of the image on the display; and
storing only the smaller resolution version of the image and not storing the full resolution version of the image.

2. The accessing computer of claim 1, wherein the full resolution version is 1920 by 1080 pixels.

3. The accessing computer of claim 1, wherein the smaller resolution version is 720 by 480 pixels.

4. The accessing computer of claim 1, wherein the accessing computer is configured to retrieve image information to render the smaller resolution version of the image, the image information being in the format: img width="[int]" height="[int]" url="[image name]">, wherein "int" is a respective integer.

5. The accessing computer of claim 1, wherein the accessing computer is configured to retrieve image information to render the smaller resolution version of the image, the image information being in the format: Image img=new Image(); img.width=[int]; img.height=[int]; img.url="image name", wherein "int" is a respective integer.

6. The accessing computer of claim 1, wherein with the smaller resolution version of the image stored locally, the accessing computer accessing the computer readable storage medium is configured to, responsive to a user selection of an image, determine whether information of the image specified on a web page subject to the user selection indicates the same dimensions and identifies the same image as the smaller resolution version of the image stored locally, and responsive to a determination that information of the image specified on the web page subject to the user selection indicates the same dimensions and identifies the same image as the smaller resolution version of the image stored locally, present the locally stored image on the display.

7. The accessing computer of claim 6, wherein the processor is configured to, responsive to a determination that information of the image specified on the web page subject to the user selection indicates different dimensions than the smaller resolution version of the image stored locally and identifies the same image as the smaller resolution version of the image stored locally, retrieve the full resolution version of the image from the server, not store the full resolution version, decompress the full resolution version to a new smaller version of the image according to the information of the image, render the new smaller version, and store the new smaller version in place of the smaller resolution version of the image previously stored locally.

8. Method comprising:
accessing an image specified by a web page to be rendered at a resolution that is smaller than a resolution of a full version of the image stored on a server;
downloading the full version of the image;
not storing the full version of the image on computer memory or computer disk media;
processing the full image to render a smaller resolution version of the image according to the resolution specified by the web page;
presenting the smaller resolution version of the image; and
storing the smaller resolution version of the image and not storing the full version of the image.

9. The method of claim 8, wherein the full resolution version is 1920 by 1080 pixels.

10. The method of claim 8, wherein the smaller resolution version is 720 by 480 pixels.

11. The method of claim 8, comprising retrieving image information to render the smaller resolution version of the image, the image information being in the format: img width="[int]" height="[int]" url="[image name]">, wherein "int" is a respective integer.

12. The method of claim 8, comprising retrieving image information to render the smaller resolution version of the image, the image information being in the format: Image img=new Image(); img.width=[int]; img.height=[int]; img.url="image name", wherein "int" is a respective integer.

13. The method of claim 8, comprising storing the smaller resolution version of the image locally to an accessing computer, the accessing computer responsive to a user selection of an image determining whether information of the image specified on a web page subject to the user selection indicates the same dimensions and identifies the same image as the smaller resolution version of the image stored locally, and responsive to a determination that information of the image specified on the web page subject to the user selection indicates the same dimensions and identifies the same image as the smaller resolution version of the image stored locally, presents the locally stored image on the display.

14. The method of claim 13, wherein responsive to a determination that information of the image specified on the web page subject to the user selection indicates different dimensions than the smaller resolution version of the image stored locally and identifies the same image as the smaller resolution version of the image stored locally, retrieves the full resolution version of the image from the server, does not store the full resolution version, decompresses the full resolution version to a new smaller version of the image according to the information of the image, renders the new smaller version, and stores the new smaller version in place of the smaller resolution version of the image previously stored locally.

15. Computer system comprising:
accessing computer rendering a web page on a display, the web page containing image information including an identification of a full resolution version of an image stored on a server computer and a desired rendering resolution smaller than the full resolution;
the accessing computer responsive to a user selection of the image retrieving the full resolution version of the image from the server but not storing the full resolution version, instead processing the full resolution version to render a smaller resolution version according to the image information and presenting and storing only the smaller resolution version.

16. The system of claim 15, wherein the full resolution version is 1920 by 1080 pixels.

17. The system of claim 15, wherein the smaller resolution version is 720 by 480 pixels.

18. The system of claim 15, wherein the accessing computer retrieves image information to render the smaller resolution version, the image information being in the format: img width="[int]" height="[int]" url="[image name]">, wherein "int" is a respective integer.

19. The system of claim 15, wherein the accessing computer retrieves image information to render the smaller resolution version, the image information being in the format: Image img=new Image(); img.width=[int]; img.height=[int]; img.url="image name", wherein "int" is a respective integer.

20. The system of claim 15, wherein with the smaller resolution version stored locally, the accessing computer responsive to a user selection of an image determines whether information of the image specified on a web page subject to the user selection indicates the same dimensions and identifies the same image as the smaller resolution version, and responsive to a determination that information of the image specified on the web page subject to the user selection indicates the same dimensions and identifies the same image as the smaller resolution version, presents a locally stored image on the display, and responsive to a determination that information of the image specified on the web page subject to the user selection indicates different dimensions than the smaller resolution version and identifies the same image as the smaller resolution version of the image, retrieves the full resolution version of the image from the server, does not store the full resolution version, decompresses the full resolution version to a new smaller version of the image according to the information of the image, renders the new smaller version, and stores the new smaller version in place of the smaller resolution version of the image previously stored locally.

* * * * *